Jan. 18, 1966  J. J. TOCCHINI  3,229,368
DENTAL SYSTEM

Filed Feb. 25, 1963  4 Sheets-Sheet 1

INVENTOR.
JOHN J. TOCCHINI
BY Fryer & Tjensvold

ATTORNEYS

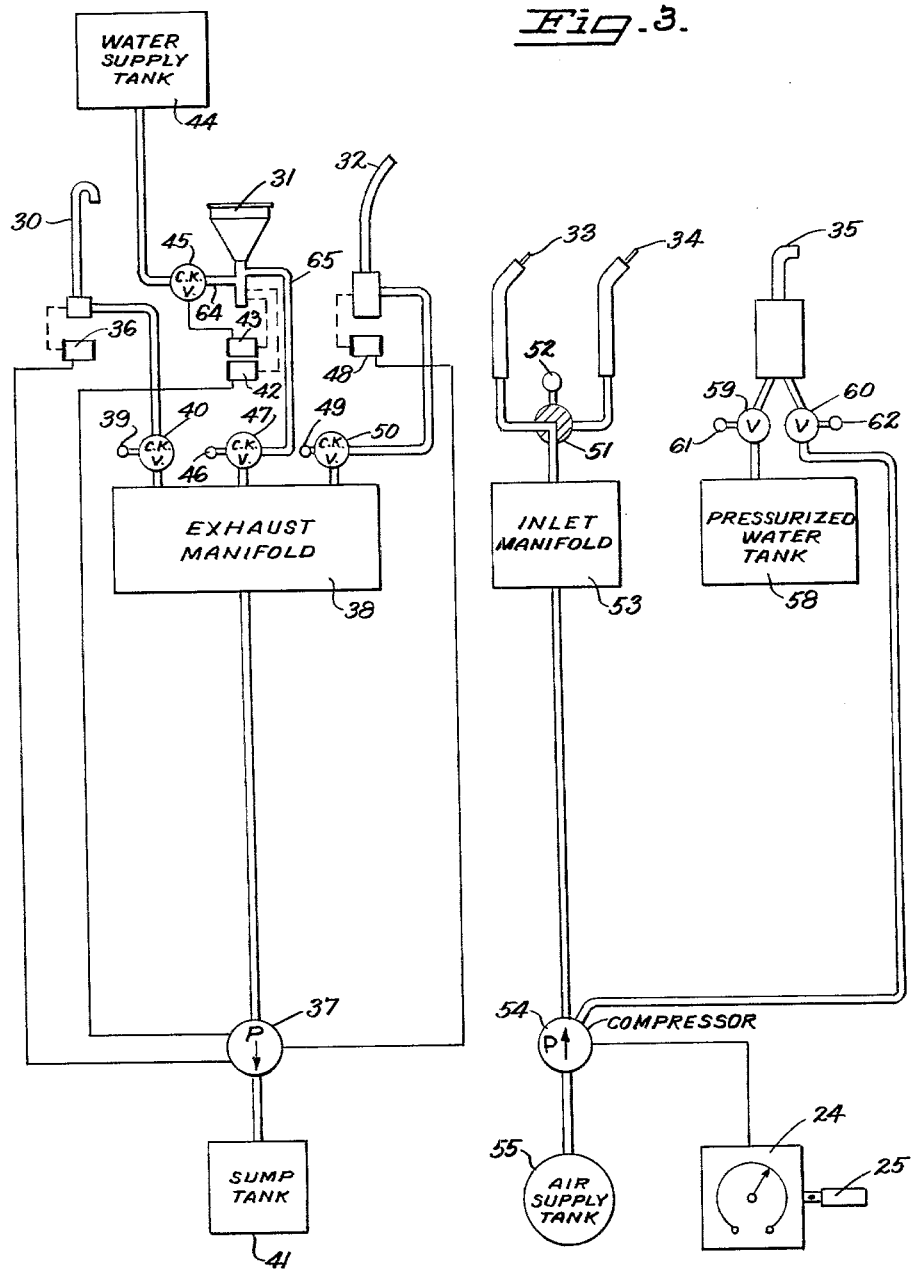

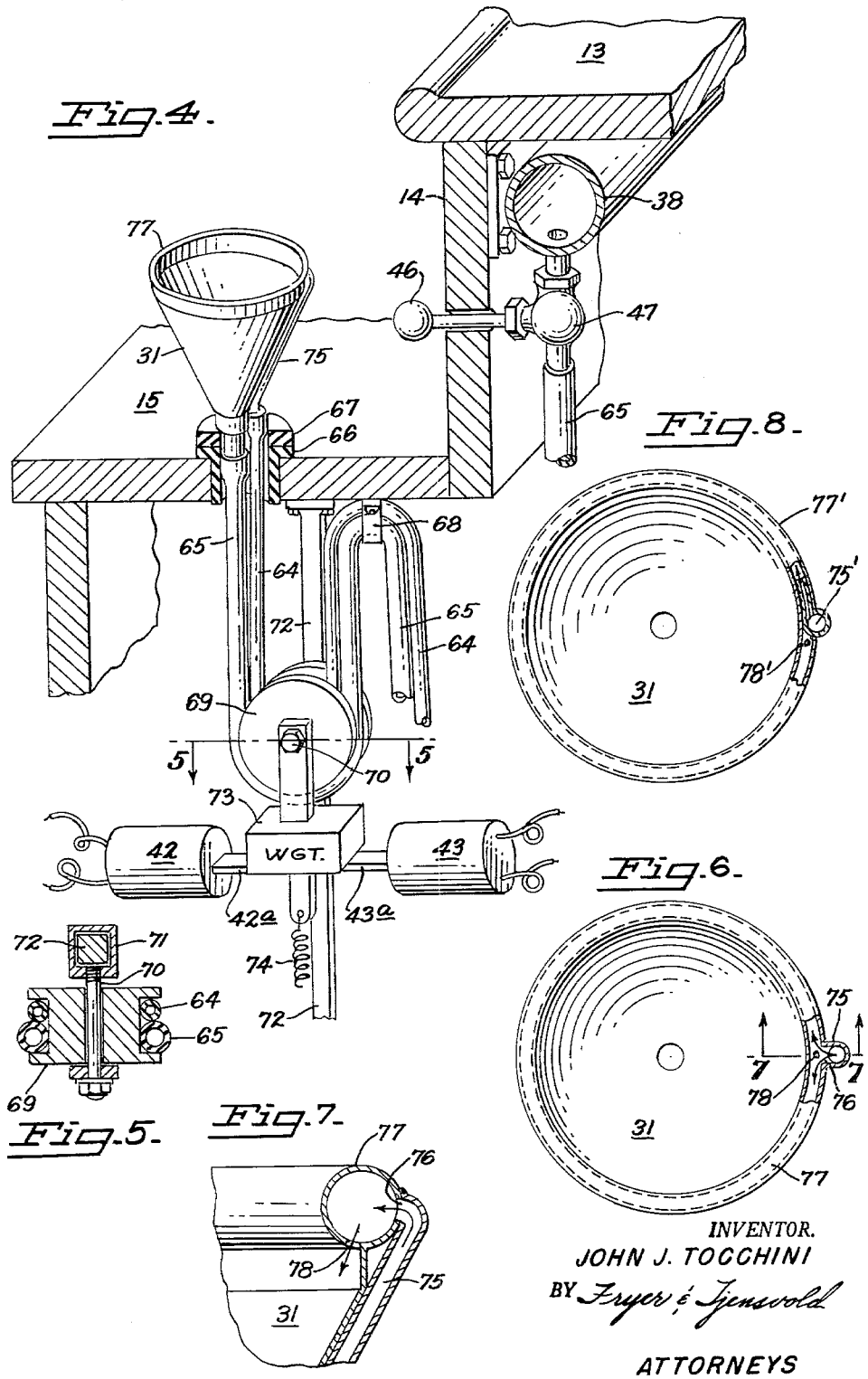

United States Patent Office 3,229,368
Patented Jan. 18, 1966

3,229,368
DENTAL SYSTEM
John J. Tocchini, Tiburon, Calif., assignor to College of Physicians and Surgeons of San Francisco, Inc., San Francisco, Calif., a corporation of California
Filed Feb. 25, 1963, Ser. No. 260,768
8 Claims. (Cl. 32—22)

This invention relates to a dental system and more particularly relates to a cabinet having dental equipment integrated therein to facilitate dental work.

Generally, a conventional dental system is costly, bulky in nature, and arranged in such a cumbersome manner that a dentist's work area is somewhat limited and consequently work efficiency is impaired. In particular, a present day dental system is not arranged to permit a dentist to expeditiously obtain the necessary dental instrument he desires without disturbing a patient and also interfering with other dental equipment.

This invention has attempted to overcome the above difficulties by providing a low cost, compact and integrated dental system comprising a cabinet having dental instruments uniquely arranged therein to promote a dentist's work efficiency. Novel concepts of this invention comprise a cabinet stepped-down portion arranged adjacent the top of the cabinet wherein instruments are arranged so that the dentist may expeditiously carry forth his work in an efficient manner. The dental system of this invention makes possible the utilization of a mobile system which further enhances such work efficiency.

An object of this invention is to provide a low cost, compact and integrated dental system which promotes a dentist's work efficiency.

Another object of this invention is to provide a durable dental cabinet wherein dental work instruments and their actuating means may be compactly arranged.

A further object of this invention is to provide an efficient dental system wherein dental work instruments are arranged to facilitate expeditious removal and replacement by a dentist with limited annoyance to a patient and no interference with other dental equipment. Further and more specific objects of this invention will become apparent from the following description taken in connection with the accompanying drawings wherein:

FIG. 3 is a schematic view disclosing the actuating means for various dental instruments employed with the dental system shown in FIGS. 1 and 2;

FIG. 4 is an enlarged, partially sectioned view disclosing the manner in which a typical dental instrument is mechanically integrated into the dental system of FIGS. 1 and 2;

FIG. 5 is a cross-sectional view taken on line 5—5 in FIG. 4;

FIG. 6 is a plan view of the dental instrument shown in FIG. 4 with a portion thereof sectioned for clarification purposes;

FIG. 7 is a partial sectional view taken on line 7—7 in FIG. 6; and

FIG. 8 is a view similar to FIG. 6, disclosing a modification of the dental instrument shown therein.

Figure 1:
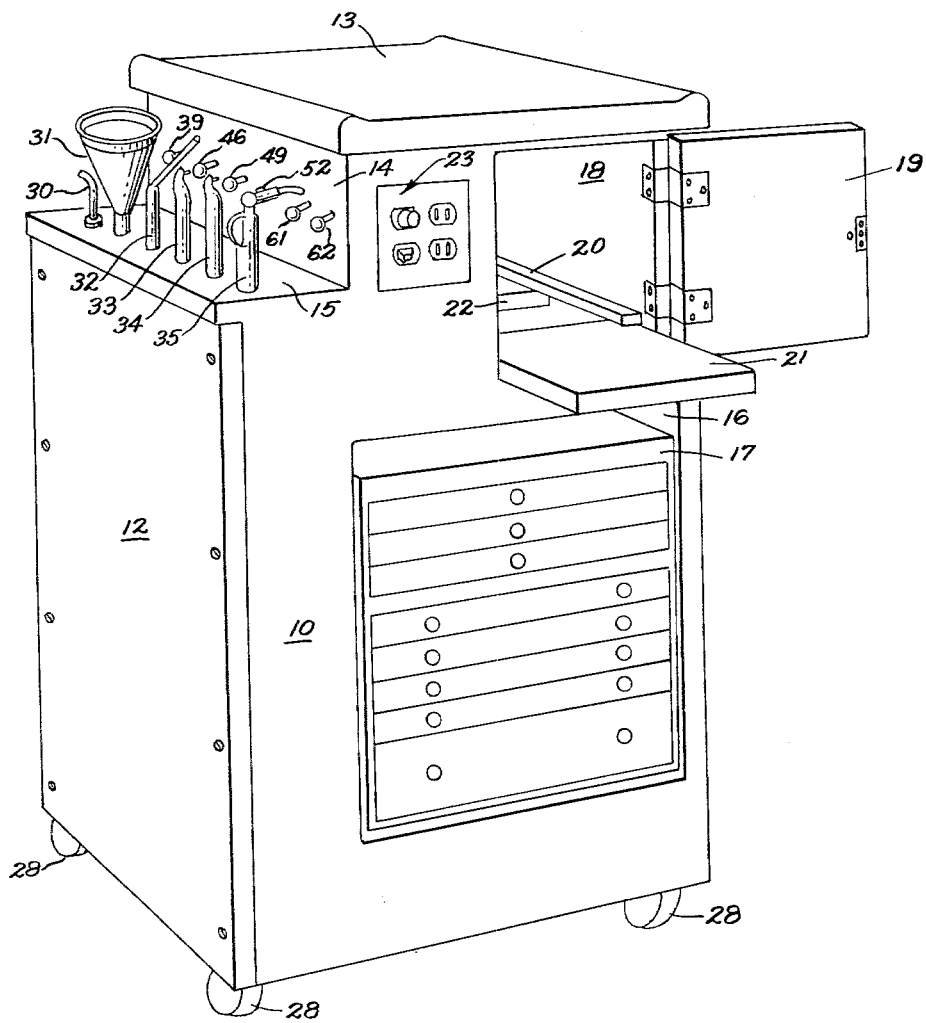
FIG. 1 is a perspective view particularly disclosing the front side of the dental system of this invention.
Figure 2:
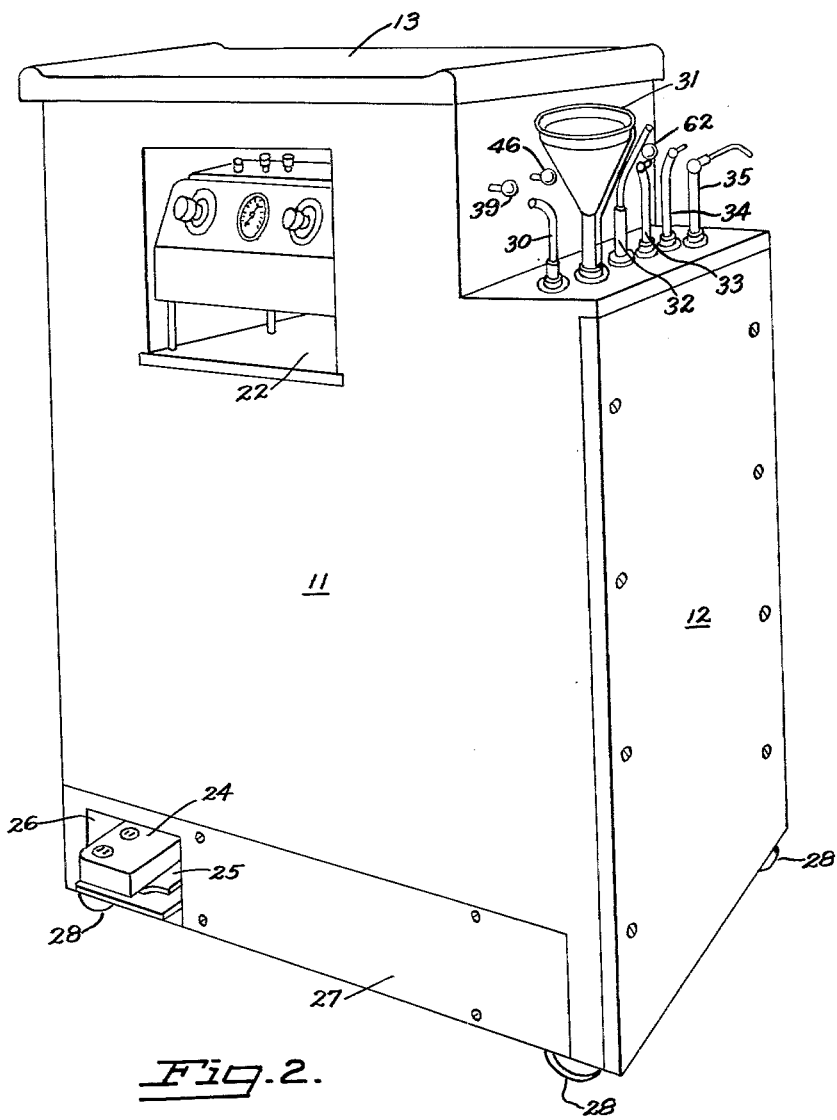
FIG. 2 is a perspective view particularly disclosing the opposite side of the dental cabinet shown in FIG. 1.

Referring to FIGS. 1 and 2, the upright dental cabinet of the dental system comprises a vertical first side panel 10, a second side panel 11 and a removable front panel 12. The fourth vertical panel, i.e., the back panel, is not clearly disclosed in these views and preferably comprises a flat panel having an uninterrupted outer surface. The cabinet further comprises a top panel 13 preferably having raised end portions formed thereon in the manner shown to prevent equipment maintained thereon from sliding off the cabinet. The top panel extends laterally from the back panel towards said front panel to form a stepped-down portion comprising panel portions 14 and 15 and to thus provide a space for the compact retention of dental instruments therein. It should be particularly noted that due to this arrangement trays and the like may be placed on panel 13 of the cabinet without incurring the obstruction of the instruments.

The cabinet has a chamber 16 formed therein adapted to house a removable sub-cabinet 17, comprising a plurality of equipment receiving drawers. Although the slidably mounted drawers may be mounted directly in the first side panel of the cabinet, in many dental applications it is desirable to remove all of the drawers at one time. Thus, the need for the above described sub-cabinet.

A cupboard 18 is formed through the cabinet between the side panels and is adapted to be closed on at least one end by a hingedly mounted door member 19. As shown, the cupboard is arranged adjacent the top and back panels.

A stationary rail 20 is secured at a lower portion of the side wall which forms the cupboard and is suitably arranged to guide sliding movements of shelves 21 and 22. These shelves are adapted to retain standard dental equipment thereon. Suitable stop members may be mounted in the cupboard to prevent complete removal of the shelves from the cabinet.

As shown in FIG. 1, electrical switch and plug means 23 may be arranged on the cabinet. Referring to FIG. 2, a rheostat 24 having a foot pedal 25 is adapted to be positioned in a cut-out portion 26 formed through the second side panel adjacent a lower corner of the cabinet formed at the intersection of this panel and the back panel. Thus, the rheostat may be retained in this cut-out portion when not in use. As will be hereinafter more fully understood, such a conventional foot pedal type rheostat is used in connection with the operation of dental handpieces adapted to carry burs. A second removable panel 27 may be provided, if so desired. However, in practical applications, it has been found that the dental tool actuating means maintained within the cabinet are readily accessible when only removable panel 12 is utilized.

It should be noted that the cabinet is adapted to be movably mounted on universal rollers 28 of the conventional type. Such mounting permits free movement of the integrated dental system to any desired position adjacent a patient. The cabinet panel may be covered with a suitable material, such as Formica, to enhance rigidity characteristics thereof and to also afford a pleasing cabinet appearance.

FIG. 3 discloses the operative arrangement of typical, vertically arranged dental instruments and the actuating means therefor. Such aligned instruments may comprise a saliva aspirator 30, a funnel 31 for receiving expectorant, an aspirator tip 32 for aspirating water during drilling, handpieces 33 and 34 adapted to selectively carry burs and a hot air and water spray 35. Aspirator 30 is mechanically associated with a solenoid 36, as will be hereinafter more fully described, to actuate the same when the aspirator is lifted in an upward direction from the cabinet as viewed in FIG. 1 or 2. In response to a tripping of solenoid 36, a conventional pump 37 is activated and begins to draw a vacuum on an exhaust manifold 38. Simultaneously therewith, a valve stem 39 of a check valve 40 may be pulled to permit the aspirator to communicate with the exhaust manifold. The valve stems are reciprocally mounted in panel portion 14 of the cabinet adjacent to the instrument with which they cooperate. Thus, the patient's saliva may be drawn into the aspirator and transmitted to the exhaust manifold and thereafter to a sump 41.

Funnel 31 functions in a somewhat similar manner in that movement thereof in an upward direction will function to mechanically trip switches of solenoids 42 and 43. In response to an actuation of the two solenoids, pump 37 is activated and water is permitted to flow from a tank 44 through a check valve 45 to the funnel. Simultaneously therewith, a valve stem 46 may be pulled to thereby open a check valve 47 and permit the expectorant and water retained in the funnel to be transmitted to the sump through the exhaust manifold.

Movement of aspirator tip 32 in an upward direction functions to mechanically trip a solenoid 48 to actuate pump 37. Simultaneously therewith, a valve stem 49 of a check valve 50 may be moved to permit communication between the aspirator tip and the exhaust manifold in a manner similar to that above described.

Either handpiece 33 or 34 may be actuated by selectively moving a two-way valve 51 to the desired position by a valve stem 52. In the valve position shown, handpiece 33 will be actuated. A standard inlet manifold 53 is arranged to communicate compressed air to the handpieces to actuate the bur attached thereto. A pump 54 communicates with the inlet manifold to transmit air thereto from an air supply tank 55. Conventional rheostat 24 is arranged to selectively control the speed of pump 54 and thus the bur by means of foot pedal 25. Without further explanation, it should be understood that the schematically shown electrical connections may be suitably arranged by one skilled in the art to effect the above stated functions. Included in such an arrangement would be a connection of the above briefly described system to a suitable electrical power supply.

Hot air and water spray 35 is arranged to selectively communicate with pressurized water tank 58 and/or air supply tank 55 by means of valves 59 and 60, respectively. Reciprocally mounted valve stems 61 and 62 are arranged on the cabinet to permit such selective communication.

As exemplified by the arrangement of funnel 31 in FIG. 4, each instrument is removably mounted in panel portion 15 and is adapted to be selectively moved away from the cabinet a predetermined distance and automatically returned to its original position into the panel portion. To achieve this desiderata, passages formed in funnel 31 are arranged to communicate with a water supply hose 64 and an exhaust hose 65 which are in turn arranged to extend through an aperture formed in cabinet wall portion 15. In actual applications, the hoses would be relatively longer in relation to the dimensions of the other elements than shown. An annular bushing 66 is fixedly attached in this aperture to facilitate sliding movements of the hoses therethrough. An annular washer 67 may be employed as a stop member to prevent the funnel from moving further downwardly than the position shown in FIG. 4.

The hoses are secured to the cabinet by a clamp 68 and partially surround and are guided in their movements by a pulley 69, rotatably mounted on a shaft or bolt member 70. As more clearly shown in FIG. 5, the bolt member is attached to a channel member 71 which is arranged for vertical sliding movements on a guide rod 72. The guide rod is fixedly secured to juxtaposed wall portions of the cabinet. Thus, lateral movement of the pulley will be prevented since channel member 71 will at all times guide the vertical movements thereof.

Bolt member 70 further carries a suspended weight member 73. The weight member functions to aid in the automatic return of the hose to the FIG. 4 position. To further aid in this returning function, a tension spring 74 may be secured to the interior of the cabinet and also to the weight member.

The weight members are so arranged that upon upward movement thereof along with pulley 69, they will trip switches 42a and 43a of solenoids 42 and 43, respectively. Actuation of the solenoids will function to carry forth the above described functions of the actuating means for funnel 31. As is further shown in FIG. 4, valve stem 46 is reciprocally mounted through cabinet wall portion 14 and is adapted to selectively actuate valve 47 to permit communication between funnel 31 and exhaust manifold 38. The exhaust manifold may be mounted on the cabinet in the manner shown.

As above stated, the pulley arrangement above described in connection with funnel 31 may also be utilized in connection with dental instruments 32–35, with slight changes in construction and arrangement thereof remaining within the scope of this invention. Also, the additionally employed valve stems 39, 49, 52, 61 and 62 may be mounted in a manner similar to that described in connection with valve stem 46.

The construction and arrangement of the funnel, comprising a sub-combination of this invention, is more clearly shown in FIGS. 6 and 7. As therein shown, the funnel comprises an enlarged opening at its upper end and a smaller opening at its lower end, adjacent stop member 67. A vertically arranged water passage 75 is formed along an outer side wall portion of the funnel. The passage terminates in an aperture 76 to discharge water into an annular manifold 77. It has been found that discharging the water in this manner will function to impart a swirling motion thereto in both directions in annular manifold 77. Thereafter, the water is discharged through an orifice 78 arranged to face the small funnel opening wherefrom the water moves downwardly and undertakes a swirling motion on the inner surface portions of the funnel for cleaning purposes.

FIG. 8 discloses a modification of the funnel shown in FIGS. 6 and 7. In this modification, a water passage 75' terminates in an annular manifold 77' so as to discharge water in only one direction therethrough. The water is thereafter discharged downwardly through an orifice 78' and a swirling motion is thereafter imparted thereto.

It should be understood that various modifications may be made to the above described dental system without departing from the scope of the invention herein. For example, the above described dental instruments may be mounted in alignment on panel portion 14 rather than panel portion 15.

I claim:

1. A dental system comprising a cabinet having a flat and uninterrupted top panel including raised end portions adapted to prevent equipment from sliding off said top panel, panel portions forming a stepped-down portion adjacent the top panel, said panel portions comprising a first vertically arranged panel portion and a second panel portion arranged below said first panel portion and extending laterally therefrom, instruments vertically arranged in aligned relationship on said second panel portion and extending therethrough, means for permitting removal of said instruments from said cabinet a predetermined distance and for automatically returning said instruments into the second panel portion, said means comprising at least one hose connected to one of said instruments and to a fluid retaining tank secured interiorly of said cabinet, a valve stem reciprocally mounted in the first panel portion of said cabinet adjacent said one instrument and valve means operatively connected with and responsive to selective movement of said valve stem to operatively communicate said tank with said hose.

2. The invention of claim 1 wherein said one instrument comprises a funnel terminating at an upper end thereof in an enlarged opening and at a lower end thereof in a small opening and having a vertically arranged passage formed along an outer side wall portion thereof and an annular manifold formed around the periphery of the enlarged opening of said funnel, said passage arranged to communicate with said manifold, said manifold having an orifice formed therein arranged to face said small funnel opening whereby a cleaning fluid may be swirled on inner surface portions of said funnel.

3. The invention of claim 1 wherein the means for removal of said instruments from said cabinet includes a vertically arranged guide rod fixedly secured within said cabinet, a pulley rotatably mounted on a shaft, a channel member slidably mounted for vertical movements on said guide rod and attached to said shaft and a weight member attached to said pulley to urge it vertically downwardly, said hose being arranged to surround peripheral portions of said pulley in such a manner that vertical upward movement of said instrument causes vertical upward movement of said pulley in response thereto.

4. A dental system according to claim 1 including a vertical front panel, back panel and first and second side panels.

5. The invention of claim 1 further comprising a plurality of drawers slidably mounted through the first side panel of said cabinet and a cupboard formed through said cabinet between said side panels and arranged adjacent said top and back panels, said cupboard having at least one shelf slidably mounted therein adapted to retain dental equipment thereon.

6. The invention of claim 1 wherein said front panel is removably mounted on said cabinet to permit access within the cabinet.

7. The invention of claim 1 further comprising a cut-out portion formed through the second side panel of said cabinet and arranged adjacent a lower corner of the cabinet formed at the intersection of the second side panel and said back panel, said cut-out portion adapted to retain a food pedal type rheostat therein.

8. The invention of claim 5 wherein said plurality of drawers are mounted within a sub-cabinet which is removably mounted in a chamber formed within said cabinet.

References Cited by the Examiner

UNITED STATES PATENTS

| | | | |
|---|---|---|---|
| 538,954 | 5/1895 | Eastman et al. | 312—301 X |
| 1,591,335 | 7/1926 | Pieper | 32—22 |
| 2,227,566 | 1/1941 | Angell | 32—22 |
| 2,308,812 | 1/1943 | Jankelson | 32—22 |
| 2,419,370 | 4/1947 | Roof | 32—22 |
| 3,066,318 | 12/1962 | Albigese | 4—263 |
| 3,180,585 | 4/1965 | Pusey et al. | 32—22 X |
| 3,197,868 | 8/1965 | Guichet | 32—22 |

FOREIGN PATENTS

| | | |
|---|---|---|
| 769,109 | 2/1957 | Great Britain. |

RICHARD A. GAUDET, *Primary Examiner.*

ROBERT E. MORGAN, *Examiner.*

UNITED STATES PATENT OFFICE
CERTIFICATE OF CORRECTION

Patent No. 3,229,368                           January 18, 1966

John J. Tocchini

It is hereby certified that error appears in the above numbered patent requiring correction and that the said Letters Patent should read as corrected below.

In the grant, lines 2 to 4, for "assignor to College of Physicians and Surgeons of San Francisco, Inc., of San Francisco, California, a corporation of California," read -- assignor to University of the Pacific, of Stockton, California, a corporation of California, --; lines 13 and 14, for "College of Physicians and Surgeons of San Francisco, Inc., its successors" read -- University of the Pacific, its successors --; in the heading to the printed specification, lines 3 to 5, for "assignor to College of Physicians and Surgeons of San Francisco, Inc., San Francisco, Calif., a corporation of California" read -- assignor to University of the Pacific, Stockton, Calif., a corporation of California --.

Signed and sealed this 29th day of November 1966.

(SEAL)
Attest:

ERNEST W. SWIDER                            EDWARD J. BRENNER
Attesting Officer                          Commissioner of Patents